(12) United States Patent
Petersen

(10) Patent No.: US 7,331,634 B2
(45) Date of Patent: Feb. 19, 2008

(54) SECUREMENT OF HEAD REST SUPPORT INTO AUTOMOBILE SEAT FRAME

(75) Inventor: Horst Udo Petersen, Kitchener (CA)

(73) Assignee: Bend All Automotive Incorporated, Ayr, Ontario (CA)

(*) Notice: Subject to any disclaimer, the term of this patent is extended or adjusted under 35 U.S.C. 154(b) by 82 days.

(21) Appl. No.: 10/921,119

(22) Filed: Aug. 19, 2004

(65) Prior Publication Data

US 2005/0035641 A1 Feb. 17, 2005

Related U.S. Application Data

(60) Division of application No. 10/043,284, filed on Jan. 14, 2002, now Pat. No. 6,823,575, which is a continuation-in-part of application No. 09/518,207, filed on Mar. 3, 2000, now Pat. No. 6,338,191, which is a continuation-in-part of application No. 09/064,620, filed on Apr. 23, 1998, now Pat. No. 6,035,516.

(30) Foreign Application Priority Data

Apr. 25, 1997 (GB) ................................. 9708394.3

(51) Int. Cl.
*A47C 7/02* (2006.01)
*B21D 39/00* (2006.01)

(52) U.S. Cl. .................... 297/452.18; 29/509; 29/515

(58) Field of Classification Search ........... 297/452.18, 297/452.2, 391, 410; 29/508, 509; 248/408; 403/104, 242

See application file for complete search history.

(56) References Cited

U.S. PATENT DOCUMENTS

| | | | | | |
|---|---|---|---|---|---|
| 4,679,850 | A | * | 7/1987 | Bianchi et al. | 297/410 |
| 4,854,642 | A | * | 8/1989 | Vidwans et al. | 297/410 |
| 4,976,493 | A | * | 12/1990 | Frankila | 297/410 |
| 5,769,499 | A | * | 6/1998 | Dudash et al. | 297/452.18 |
| 5,816,658 | A | * | 10/1998 | Wallis | 297/410 |
| 6,836,951 | B2 | * | 1/2005 | Dudash et al. | 29/505 |
| 6,902,239 | B2 | * | 6/2005 | Kreitler | 297/410 |

* cited by examiner

*Primary Examiner*—Sarah B. McPartlin
(74) *Attorney, Agent, or Firm*—Anthony Asquith Corp.

(57) ABSTRACT

The headrest support tubes are secured to the seat frame member not by the usual welding, but by gripping the web of the member between two rings or lock-beads swaged into the metal of the tube. The first ring is swaged-out by compressing the tube. The tube, with the one ring, is then assembled into a through-hole in the web of the frame member. Then, the second ring is swaged into the metal of the tube, on the other side of the web, and the web lies gripped between the rings. The seat frame member may be an I-section extrusion, or a round tube with localised squeezed-flat areas, flanked by flanges.

17 Claims, 15 Drawing Sheets

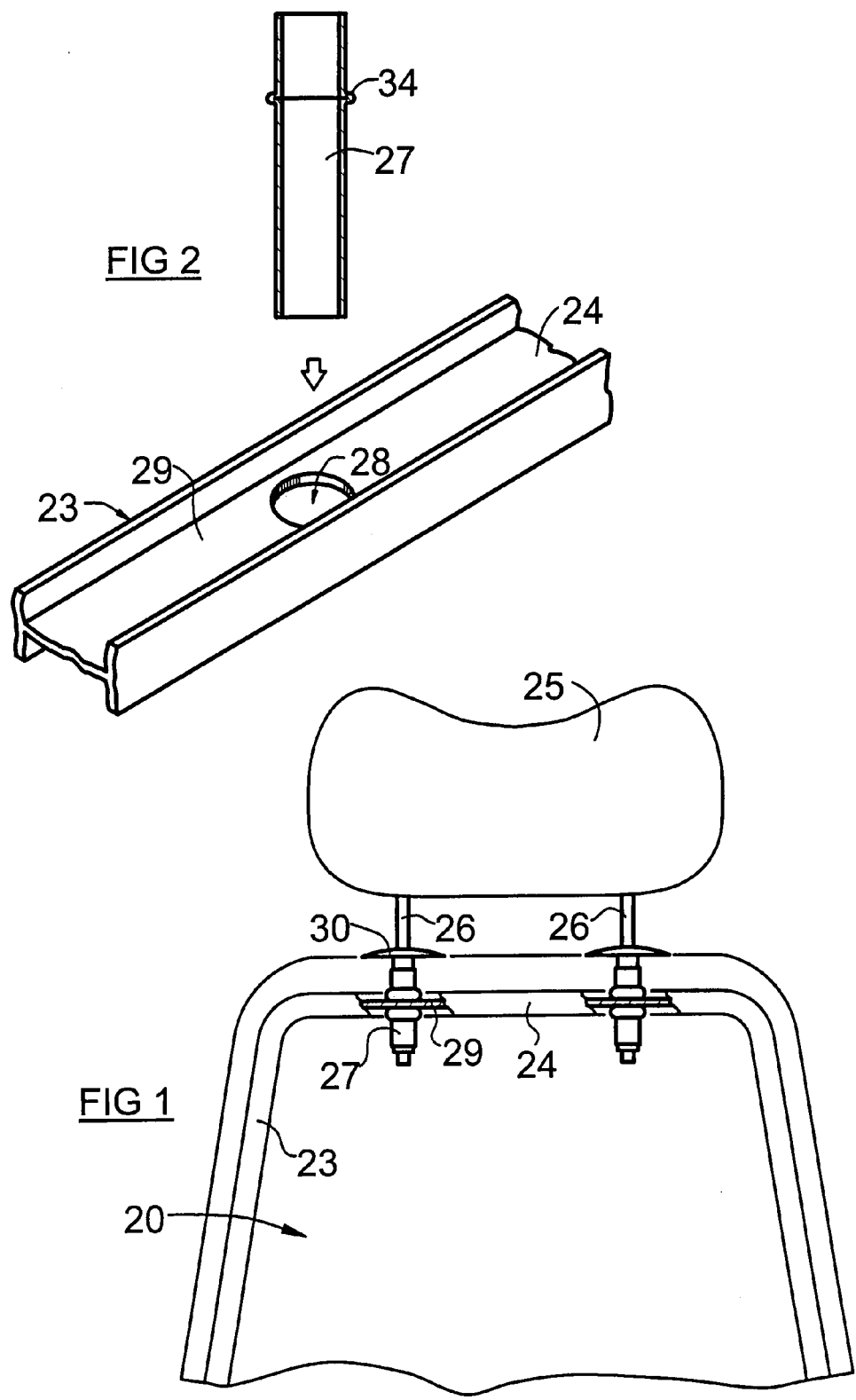

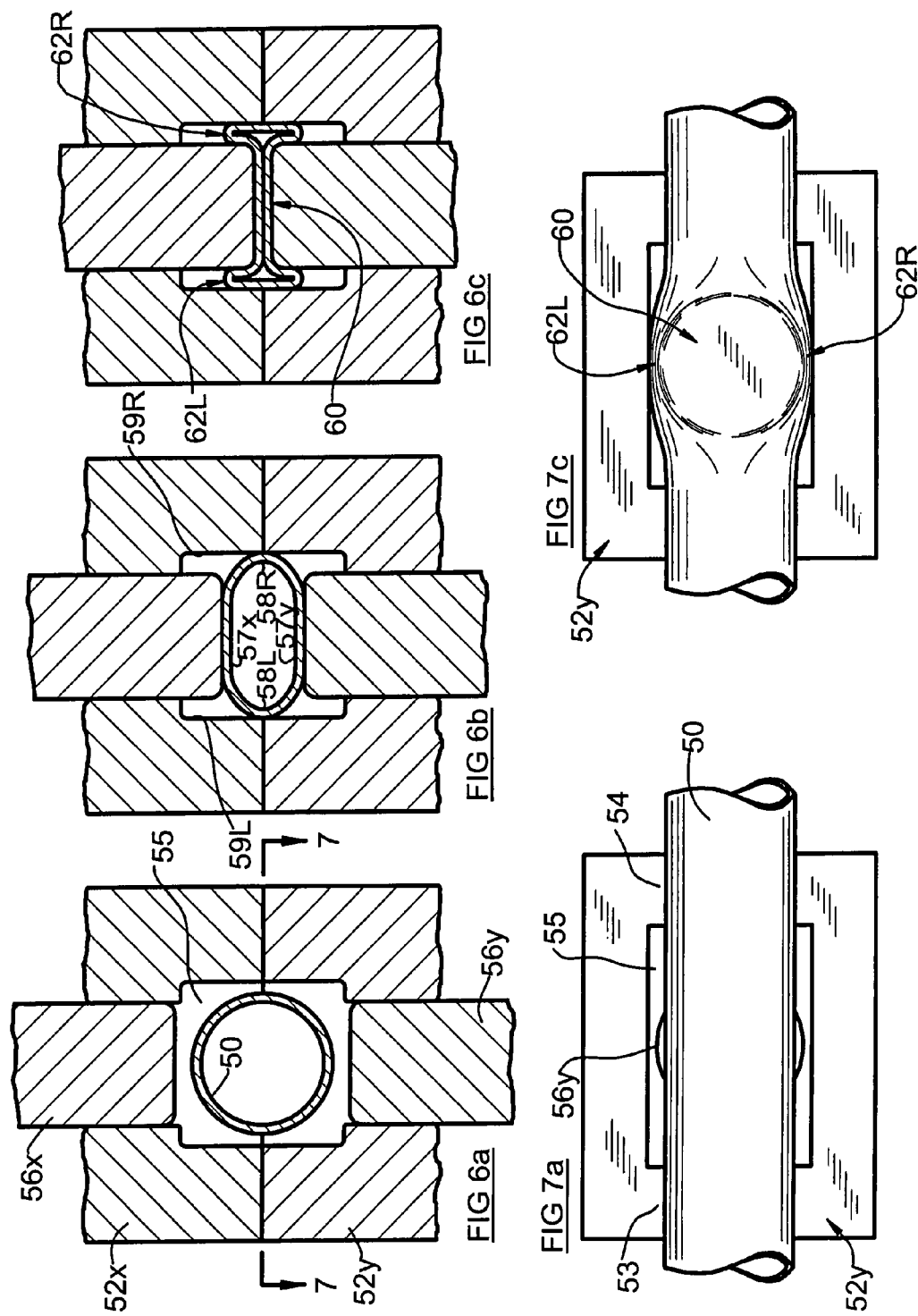

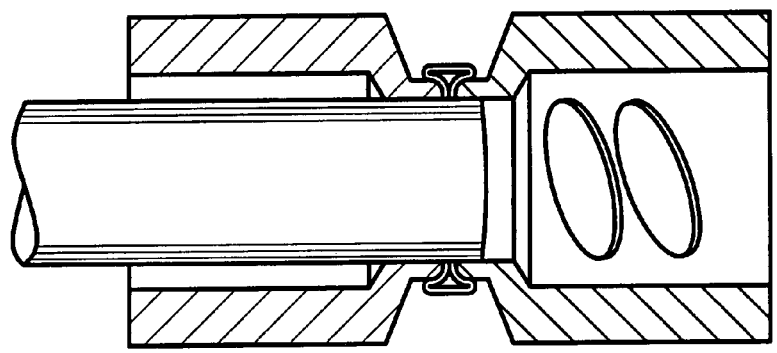
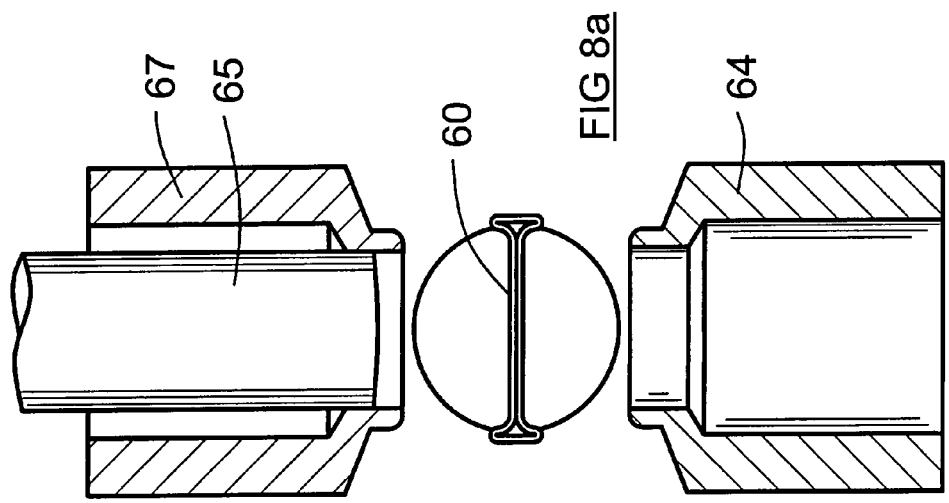

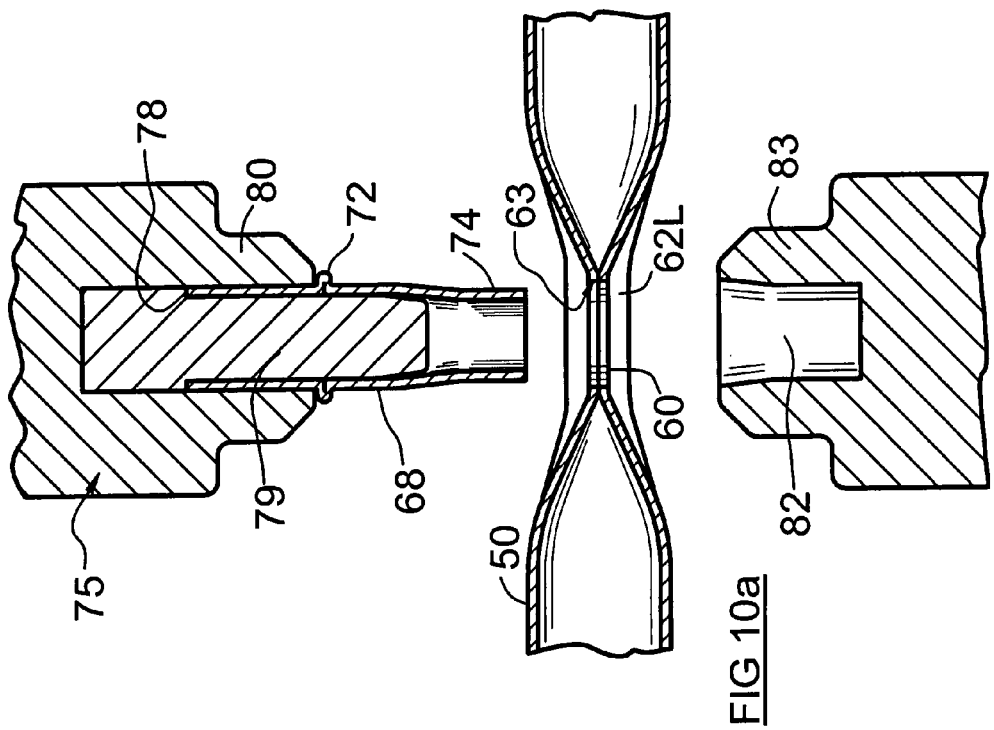
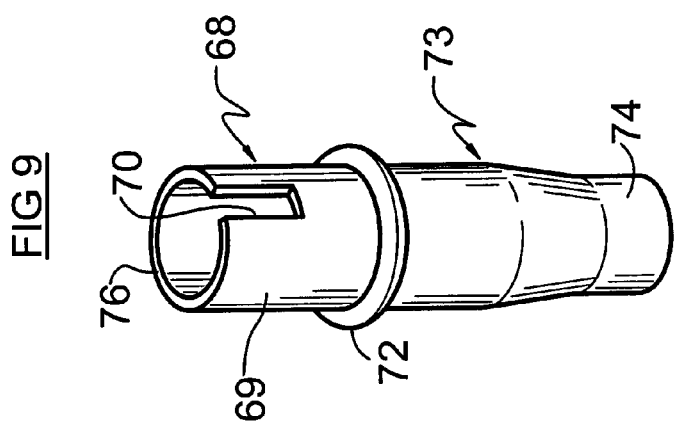

FIG. 24
FIG. 25
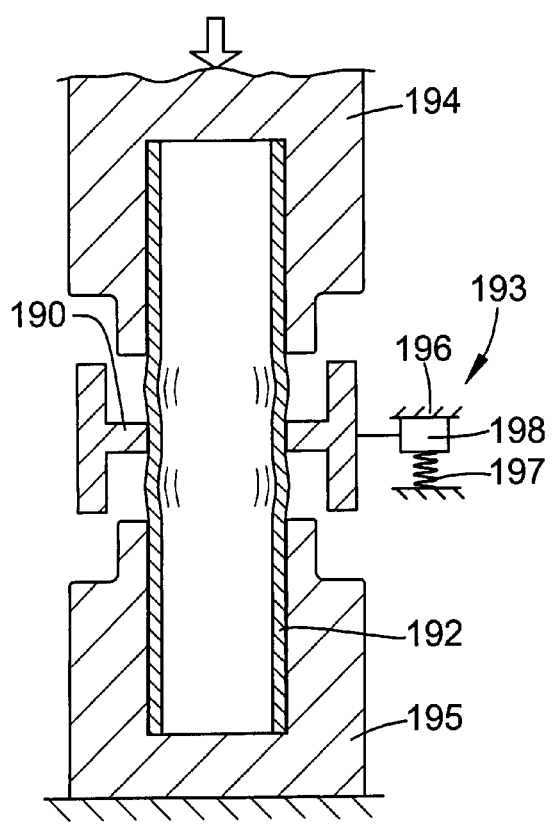
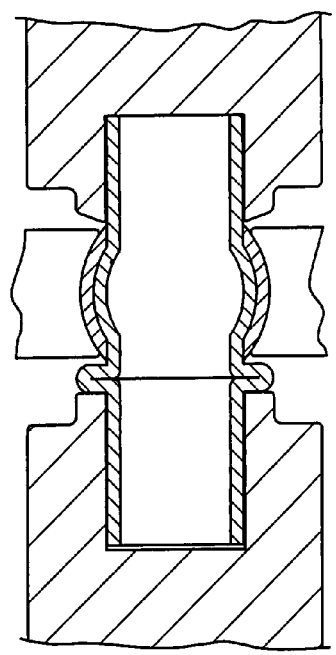

SECUREMENT OF HEAD REST SUPPORT INTO AUTOMOBILE SEAT FRAME

This is a Divisional of patent application Ser. No. 10/043,284 filed 14 Jan. 2002, now issued as U.S. Pat. No. 6,823,575;

which is a continuation-in-part of patent application Ser. No. 09/518,207 filed 3 Mar. 2000, now issued as U.S. Pat. No. 6,338,191;

which is a continuation-in-part of patent application Ser. No. 09/064,620 filed 23 Apr. 1998, now issued as U.S. Pat. No. 6,035,516;

which claims priority from GB-97/08394 filed 25 Apr. 1997.

This invention relates to the construction of automobile seats, and is directed particularly to the manner of attachment of a headrest to the frame of an automobile seat.

BACKGROUND TO THE INVENTION

The headrest on an automobile seat is often made adjustable as to height. One common way in which the headrest is mounted on the seat in a way that permits height adjustment is for the headrest to be provided with two downwardly extending pegs, and the pegs engage sockets secured into the frame of the seat. Detent means are usually provided which interact between the pegs and the sockets, whereby the headrest may be set, by the occupant of the vehicle, at one of a number of pre-set heights.

The socket in which the peg is received comprises a metal tube. A plastic liner may be provided in the tube, to act as a bearing material for the peg. In the conventional system, the tube is welded to a bracket, and the bracket is welded to a frame piece of the seat. This manner of attachment, though secure enough (because it has to be secure by regulation), unfortunately is expensive as to the labour time and the materials needed to make it that secure. Any securement system that involves welding tends to be labour-intensive and therefore expensive, besides being difficult to inspect and test. A welded system generally has to be over-engineered.

Also, welding does not lead to high accuracy. The need for accuracy of placement of the headrest on the seat is not high, although the accuracy of the spacing of the pegs and their sockets cannot be too far out; the conventional welded-on system is just about at the limit for accuracy for welding, which means that, when welding is used as the basis of the attachment method, skilled care has to be taken, which in turn does nothing to ease the cost problem.

The invention is aimed at providing a manner of securing a headrest support tube into a seat frame, in a manner that eases some of the compromises that have had to be resorted to in the conventional systems.

Typically, the operations carried out in a conventional seat manufactory include welding, bending of frame pieces, securing components together, and assembly, all of which tend to have a higher labour content. It is an aim of the headrest support system as described herein, to minimise the labour content of the task of attaching the support tubes to the seat frame piece.

Support tubes for headrests are conventionally attached to the seat frame piece by welding a bracket onto the frame piece, and then welding the tube to the bracket. Sometimes, the tube is pressed into holes in the welded-on bracket; but welding is nearly always resorted to, to assure that the tube remains in position on the bracket. Of course, the tubes can be attached securely enough, but the conventional costs of ensuring that security are high.

GENERAL FEATURES OF THE INVENTION

The invention lies in the manner of attaching the headrest-support-tube. First, the headrest-support-tube is provided with a first ring, in which the metal of the headrest-support-tube is expanded radially outwards. The headrest-support-tube is assembled into a hole in the web of the seat-frame-piece, with the first ring abutting against the web.

The frame-piece, with the headrest-support-tube resting therein, is placed in the die of a punch and die set, with the first ring in the die. The punch then is brought down over the other end of the headrest-support-tube, and a second ring is formed on the other side of the web. When the punch is withdrawn, the web lies gripped between the two rings. Usually, another headrest-support-tube is inserted into the frame-piece, in a similar manner. Then, the seat-frame piece is assembled into a seat, and finally the pegs of the headrest are inserted into the headrest-support-tubes.

THE PRIOR ART

As mentioned, headrest-support tubes are attached to the seat-frame-piece by welding. Sometimes, designers have specified intermediate brackets, rather than just welding the tube to the frame piece.

Techniques for mounting a tube into a through-hole in a piece of sheet metal are commonplace, per se. The broad range of options available include bulk-head fittings generally. Such fittings have included cases where a first bead is provided on the tube on one side of the sheet, then a second bead is swaged into the tube after the tube has been inserted into the through-hole. The technique is commonly known as lock-beading.

In cases where bulk-head fittings are being designed, a common requirement is that the fitting be air-or liquid-tight. It is recognised that the lock-beading technique is not suitable for such cases. It is recognised that lock-beading is highly suitable for cases where mechanical integrity is paramount, rather than sealing. It is also recognised that lock-beading is highly suitable for cases where access to the beads is only to be had from an axial direction, such as a case where flat-access to the through-hole is denied because the through-hole is surrounded by raised flanges.

DETAILED DESCRIPTION OF PREFERRED EMBODIMENTS

By way of further explanation of the invention, exemplary embodiments of the invention will now be described with reference to the accompanying drawings, in which:

FIG. 1 is a diagram of an automobile seat frame, shown partly in cross-section, carrying a headrest which is mounted in a manner in accordance with the invention;

FIG. 2 is a view of some of the components that support the headrest, shown at a preliminary stage of manufacture;

FIGS. 6a, 6b, 6c are cross-sections of a tooling arrangement for forming a metal tube locally into an I-section beam;

FIGS. 7a, 7c are views on the line 7-7 of FIG. 6a, corresponding to the conditions shown in FIGS. 6a and 6c respectively;

Figure 10B:
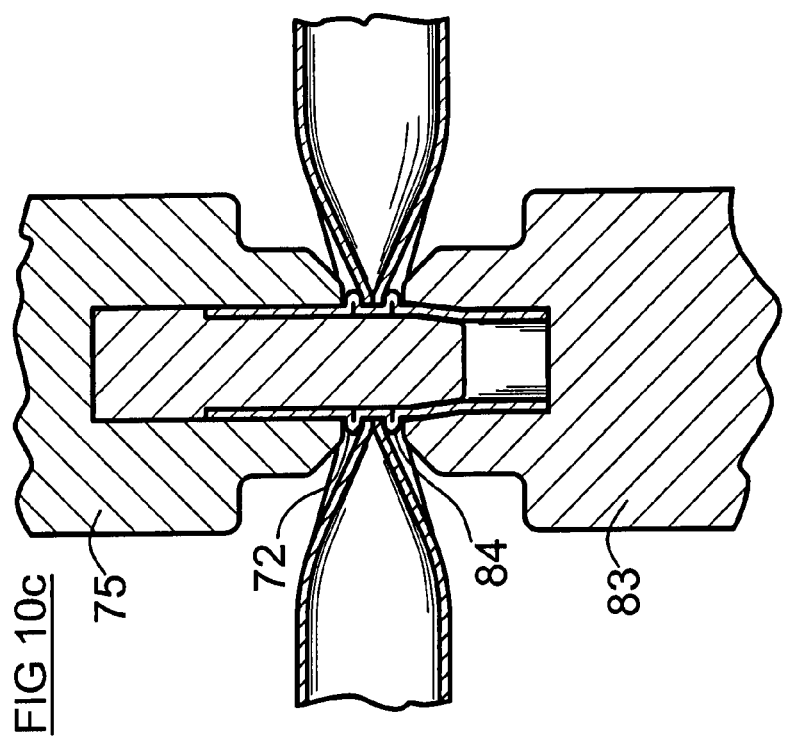
Figure 10C:
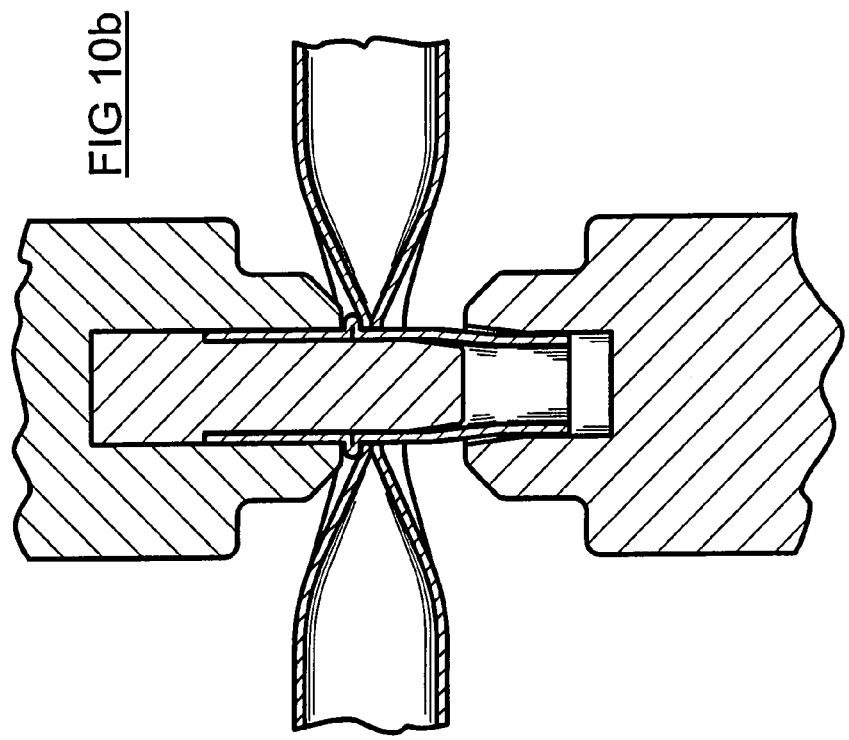
Figure 11:
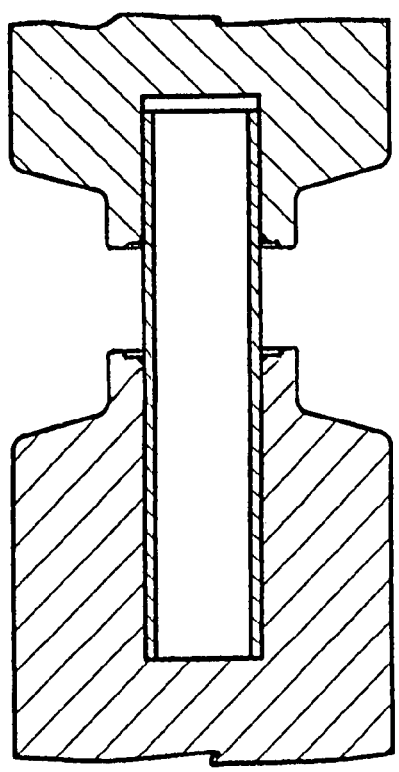
Figures 12A, 12B, 12C:
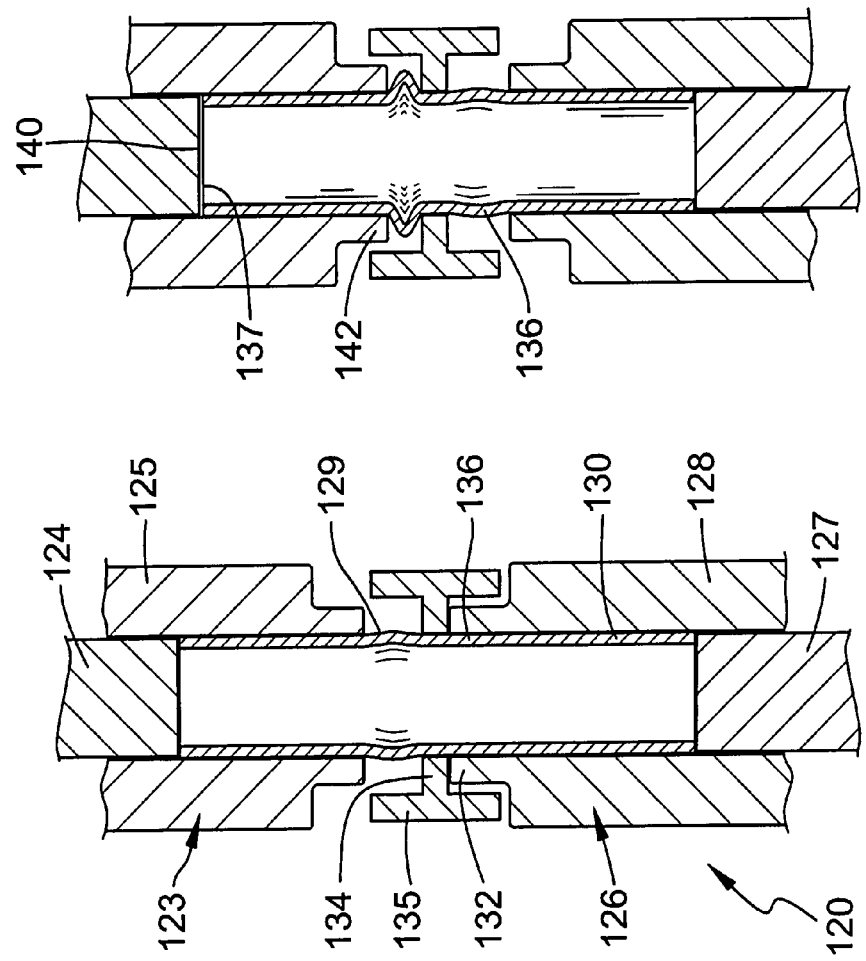
Figure 14B:
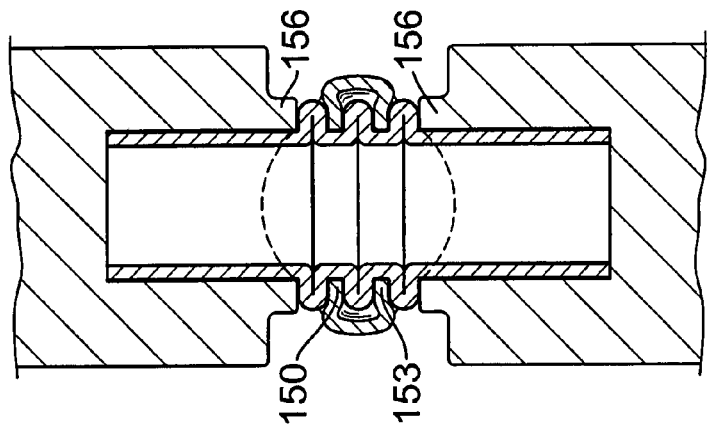
Figure 14A:
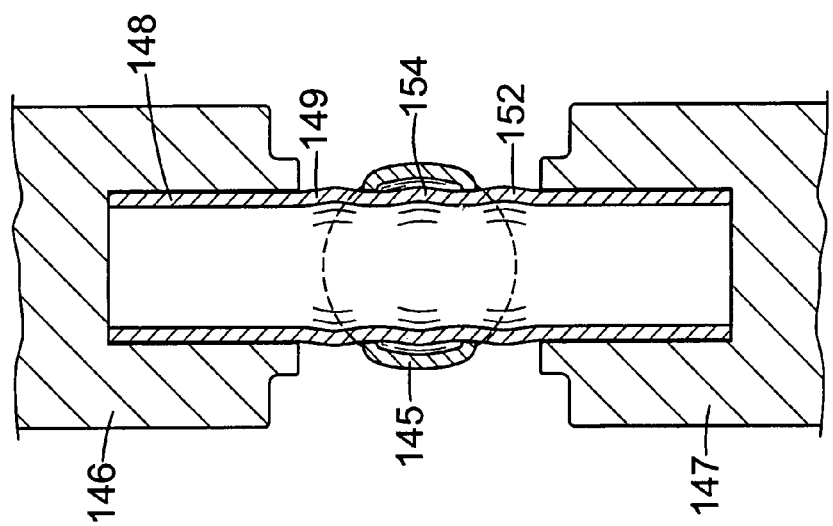
Figure 13:
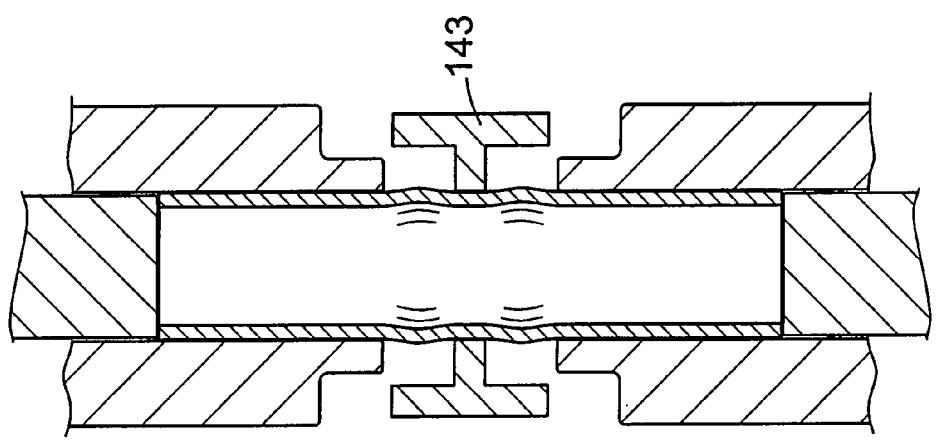
Figure 16B:
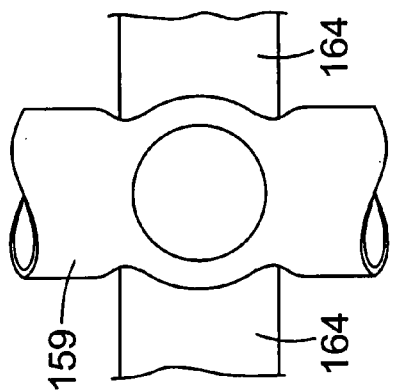
Figure 16A:
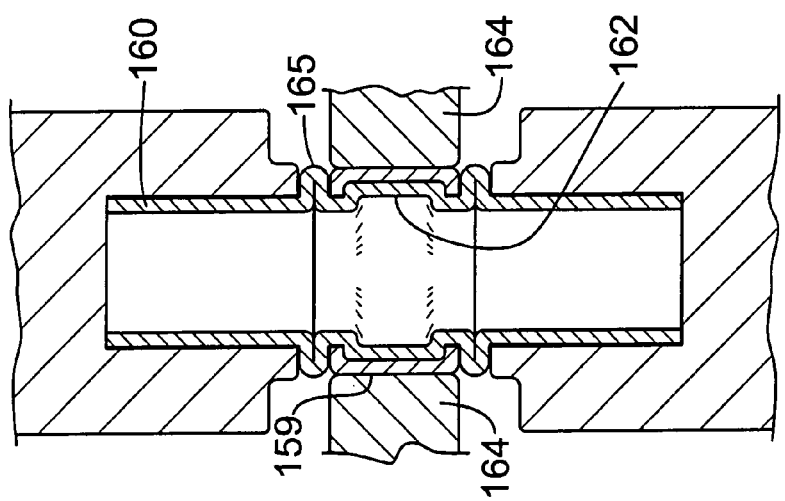
Figure 15:
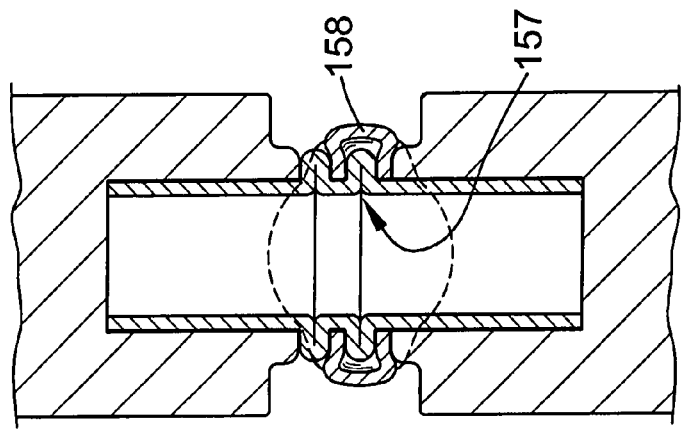
Figure 19:
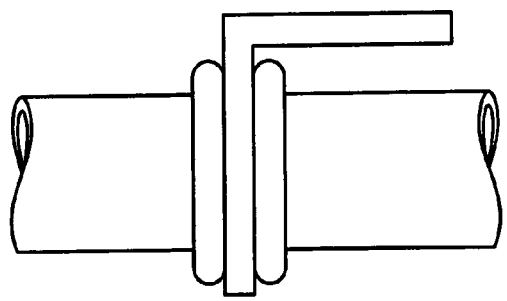
Figure 18:
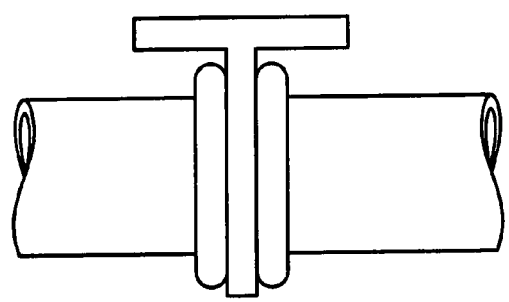
Figure 17:
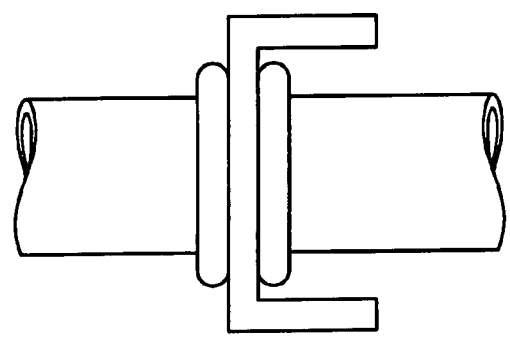
Figure 20A:
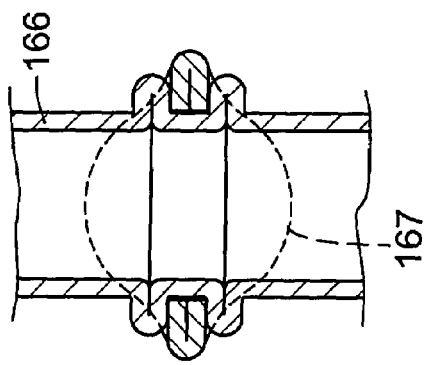
Figure 20B:
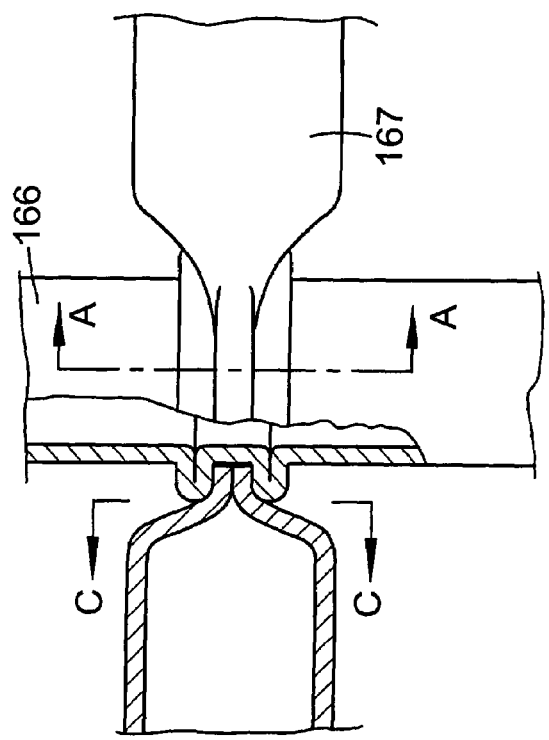
Figure 20C:
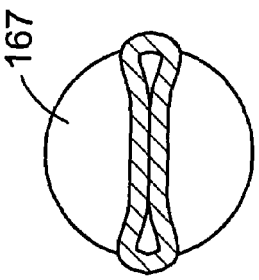
Figure 21:
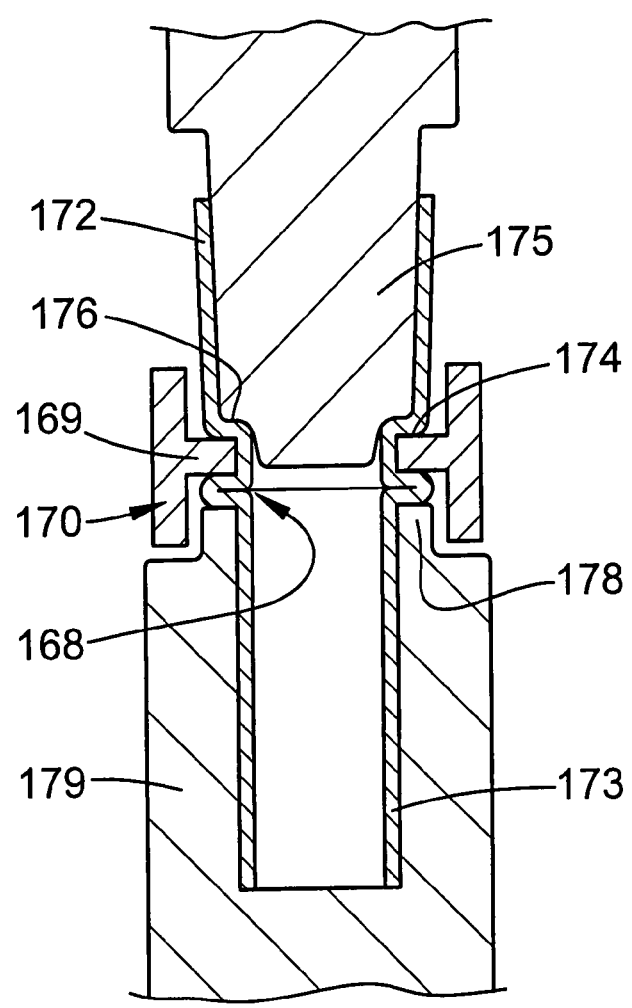
Figure 23:
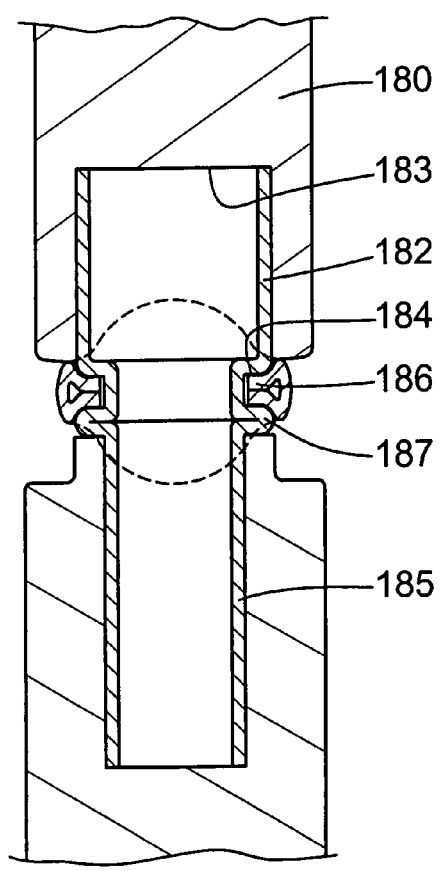
Figure 22:
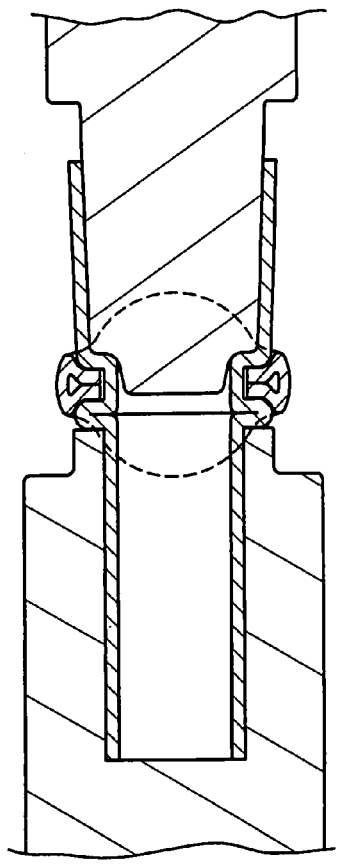

FIGS. 8*a*, 8*b* are cross-sections of a hole-punching arrangement, for making a through-hole in the web of the I-beam produced as in FIG. 6*c*;

FIG. 9 is a view of a headrest-support-tube, shown prior to final forming;

FIGS. 10*a*, 10*b*, 10*c* are cross-sections of a tooling arrangement for ring-bead-locking the headrest-support-tube of FIG. 9 into the through-hole in the web of the I-beam;

FIG. 11 is a cross-section of a pair of dies in which a first ring-bead is to be applied to a headrest-tube;

FIGS. 12*a*, 12*b*, 12*c* are cross-sections of an arrangement of punches for forming a ring-bead and a locking-bead for locking a headrest tube onto a seatframe rail;

FIG. 13 is a cross-section of another arrangement of punches for forming a ring-bead and a locking bead onto a seatframe;

FIGS. 14*a*,14*b* are cross-sections of an arrangement of punches for forming a ring-bead and a locking bead onto a seatframe rail of a round cross-section;

FIG. 15 is a cross-section of a variation of the arrangement of FIGS. 14*a*, 14*b*;

FIG. 16*a* is a cross-section of another variation;

FIG. 16*b* is a side elevation of FIG. 16*a*;

FIGS. 17,18,19 show different extruded aluminum profiles, to which a headrest tube has been lock-beaded;

FIGS. 20*a*, 20*b*, 20*c* are various views of a round seatframe rail to which a headrest tube has been lock-beaded;

FIGS. 21,22,23 are cross-sections of various arrangements of punches for using a ring-bead and a locking shoulder to lock a headrest tube onto a seatframe rail;

FIG. 24 is a cross-section of another arrangement of punches for lock-beading a headrest tube onto a seatframe rail;

FIG. 25 is a cross-section of another arrangement of punches for lock-beading a headrest tube onto a seatframe rail.

The apparatuses shown in the accompanying drawings and described below are examples which embody the invention. It should be noted that the scope of the invention is defined by the accompanying claims, and not necessarily by specific features of exemplary embodiments.

FIG. 1 shows an automobile seat 20, having a seat frame piece 23. In this case, the seat frame piece 23 made from a length of extruded I-section aluminum. The seat frame piece is bent generally into an inverted U-shape, as shown, in which the horizontal rail 24 of the U-shape forms the horizontal top rail of the seat.

The headrest 25 of the seat 20 is formed with two pegs 26, which protrude downwards, as shown. The pegs engage into support tubes 27, which are integral with the frame of the seat. The support tubes 27 are fixed firmly to the horizontal rail 24, and in fact the support tubes pass through holes 28 in the web 29 of the I-section that forms the rail 24 (see FIG. 2).

Figure 5:
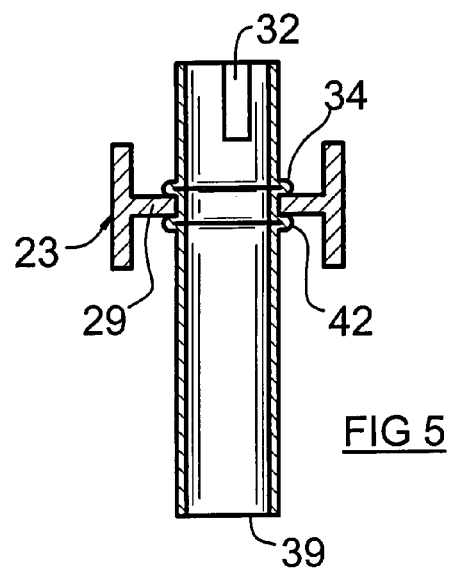
FIG. 5 is a cross-section of the headrest mounting support, shown at a later stage.

The invention is concerned with the manner of attaching the support tubes 27 into the holes 28 in the web 29 of the I-section. Usually, headrests are adjustable as to vertical position, and the adjustment is effected by moving the headrest, with its two pegs 26, vertically up or down within the tubes 27. The designer can provide a plastic sleeve 30, which is inserted into the support tube to provide a bearing for guiding the pegs for up/down adjustment movement. The designer can provide the pegs with detents (not shown), which interact with the plastic sleeves 30, or with the tubes 27, in order to define some vertical positions to which the headrest might be set. It is usually necessary to align the plastic sleeve orientationally with respect to the tube, and the plastic sleeve can be moulded with a tongue for engagement with a notch 32 (FIG. 5) in the tube, for this purpose.

In order to manufacture the seat frame, with the headrest support tubes 27 attached, first the tubes are formed with a single first swaged-out ring 34. The tube in this state is as shown in FIG. 2.

The swaged-out ring 34 is formed by pressing the ends of a plain length of tubing axially, and confining the walls thereof everywhere but at the place where the ring is to be formed. It may be noted that this first operation is carried out on the tube when only the tube itself is present, i.e in the absence of any other components. The operation of forming the first ring is of low labour content, and can be easily automated.

The job of attaching the tube 27, with its first swaged-out ring 34, into the hole 28 in the web 29 of the I-section, can also be fully automated, as can the job of swaging the first ring into the tube. This may be compared with the job of welding a bracket onto the frame piece, and then locating a tube into holes in the bracket, and then welding the tube to the bracket, in which the labour content is inevitably high.

Figure 3:
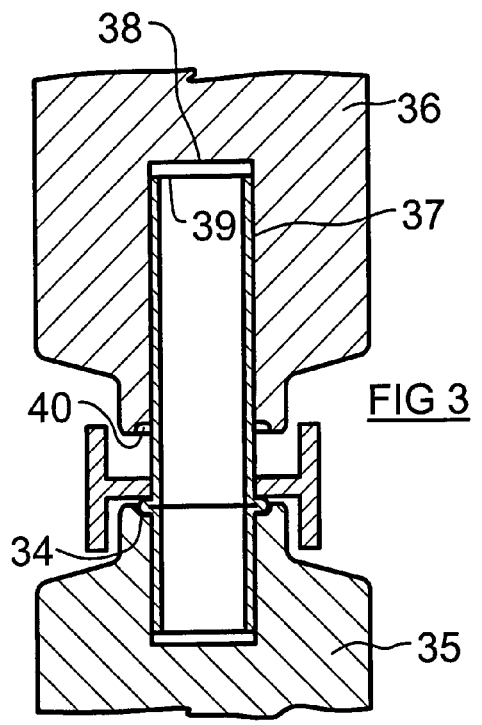
FIG. 3 is a view of a punch and die set-up, which is used at a stage in the manufacture of one of the headrest supports.

FIG. 3 shows the tube 27, with its first swaged-out ring 34, resting in a die 35. The seat frame piece 23 has been placed over the tube 27, with the web 29 resting against the first ring 34. A punch 36 is advanced, and a hole 37 in the punch slides over the upper portion of the tube 27. When the end of the hole 38 bottoms against the end 39 of the tube 27, further movement of the punch causes the upper portion of the tube to be compressed. A recess 40 in the punch allows the metal of the tube to expand outwards, in response to the axial force, with the result that the action of the punch causes a second ring 42 to be formed in the tube.

Figure 4:
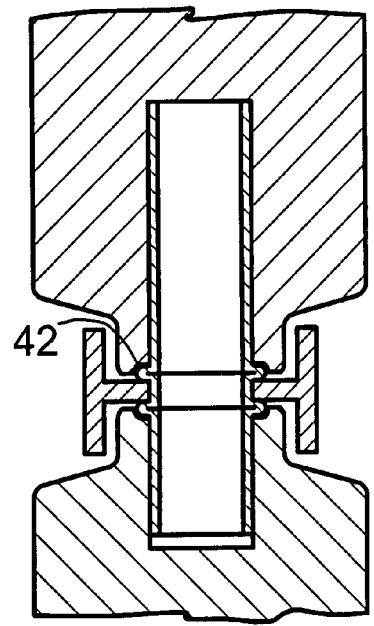
FIG. 4 is a view corresponding to FIG. 3 of another stage during manufacture.

FIG. 4 shows the situation when the punch and die are (almost) closed fully together. It will be seen from FIG. 4 that the web 29 is not contacted by either the die 35 or the punch 36 during the operation of swaging out the second ring 42. At the very end of the operation, the designer might provide that the web is in fact subjected to a squeeze between the punch and die, as a coining phase to ensure everything is straight; but in general, throughout the pressing stages indicated in FIGS. 3 and 4, the web 29 floats. As the pressing operation is nearing completion, the press forces also act on the first ring 34, and cause that to be consolidated and even coined.

The hole 28 in the frame piece is a clearance fit over the diameter of the tube 27, and so the frame-piece is not held in position, during the FIG. 4 operation, by being held by a tight fit on the tube 27. Therefore, the frame-piece 23 does need to be held—at least loosely—to prevent tipping thereof. However, that kind of holding is simple enough—at least when compared with securing the components in welding jigs.

It is important, during the FIG. 4 pressing operation, that the web 29 remain resting in close touching contact with the first ring 34. In an automated system, the designer should ensure that the components are presented properly to each other for the operation. Seat-frame-pieces can include bends and twists, and be of an awkward shape, but the designer can provide the holding-clamps etc to accommodate whatever shape the seat-frame-pieces are in. The designer can decide whether to insert the head-rest-support-tubes into the seat-frame-piece before or after the seat-frame-piece is bent and twisted to its final shape.

The designer should ensure that, whatever the configuration of the components, the web can and does rest properly (i.e in firm abutment) against the first ring during the operation of pressing the second ring: if there were to be some clearance between the web and the first ring during pressing, the final joint would be significantly less tight and secure. The ideal is that the web should be under some degree of residual compression after the punch and die have separated, even if only slightly, and that can only happen if the web remains cleanly in abutment against the first ring throughout the pressing operation.

In an alternative, the die and punch set may be arranged with a subsidiary actuable member, which loads the web tightly against the first ring while the forming of the second ring is taking place.

It is important also that the clearance between the hole 28 in the web and the diameter of the tube 27 be taken up during the pressing operation. The force that causes the metal of the tube to swell out to form the second ring 42, of course also causes the metal to swell out to fill the clearance at the hole 28. Generally, the filling of the hole 28 is so good that any crannies etc caused by burrs or other malformations arising from the punching of the hole 28, are filled completely and tightly.

The manner as described above of attaching the headrest support tubes to the seat frame provides a very secure attachment, which is amply able to accommodate the forces and abusive forces encountered in automotive seating equipment. The material costs are somewhat reduced, and the labour costs are very much reduced, as compared with what has to be done in the conventional tasks of welding the tubes to the frames.

It is conventional for the frames of automobile seats to be made from steel tubing. The head-rest-support-posts can be attached into a tubular-steel seat-frame in the manner as will now be described.

FIGS. 6*a*, 6*b*, 6*c* are views directed axially along the length of the seat-frame-tube 50, and show three stages in the preparation of the seat-frame-tube. FIGS. 7*a*, 7*c* are views corresponding to FIGS. 6*a*, 6*c* in the direction of arrows 7-7 of FIG. 6*a*.

In FIG. 6*a*, the seat-frame-tube 50 has been gripped on its outside diameter between two dies 52*x*, 52*y*. The dies are dimensioned to grip the seat-frame-tube at two spaced locations 53,54. The dies 52*x*, 52*y* are shaped so as not to directly grip the seat-frame-tube 50 in the recess 55 between the locations 53,54.

Once the dies 52*x*, 52*y* are in contact, and the seat-frame-tube 50 is firmly held, the two formers 56*x*,56*y* are advanced. At first, the seat-frame-tube 50 is flattened, as shown in FIG. 6*b*. As the upper and lower zones 57*x*,57*y* of the tube walls are forced together, the left and right side-zones 58L,58R are forced apart, and these zones of the walls come into contact with the sides 59L,59R of the recess 55.

The formers 56*x*, 56*y* are advanced until they bottom against the two thicknesses of the wall-zones 57*x*, 57*y*, as shown in FIGS. 6*c*,7*c*. The wall-zones 58L,58R are formed to the shape as shown by virtue of their confinement by the sides 59L,59R of the recess 55. It will be noted that this manner of forming the seat-frame-tube produces a localised shape which is similar to that of an I-beam. The web 60 of the I-beam shape is derived from the wall-zones 57*x*, 57*y*, and the flanges 62L,62R of the I-beam are derived from the folded wall-zones 58L,58R.

It is noted that the seat-frame-tube 50 is not simply squashed flat. The operations as described produce a configuration that is much stronger and more rigid than a flattened tube. The flanges 62L,62R, being tall (i.e the height of the flanges is equal to several thicknesses of the walls of the tube), are crucial to the rigidity of the tube against bending forces, which of course is an important consideration in a seat frame.

A hole 63 for receiving the head-rest-support-tube is punched in the web 60 of the seat-frame-tube, in the manner as shown in FIGS. 8*a*, 8*b*. A die-button 64 is brought into contact with one side of the web 60. A punch 65, carried in a stripper 67, is advanced, and pierces the hole 63 in the web. The die-button 64 and the stripper 67 are dimensioned to hold the web 60 to its desired shape during the disruption caused by the punching operation and subsequent stripping of the web from the punch 65.

The head-rest-support-tube 68 that is to be secured into the hole 63 in the web 60 is shown in FIG. 9. The head-rest-support-tube 68 is of steel, and includes an upper section 69, in which is cut a notch 70, a first ring-bead 72, and a lower section 73, the bottom section 74 of which is swaged down to a slightly smaller diameter than the rest of the head-rest-support-tube. The inside diameter of the bottom section 74 is dimensioned to be a tight location-fit on the peg 26 of the head-rest, and the reduced outside diameter of the bottom section 74 ensures an easy placement of the head-rest-support-tube 68 into the hole 63 in the web 60 of the seat-frame-tube 50.

The manner of installing the head-rest-support-tube 68 into the hole 63 is illustrated in FIGS. 10*a*, 10*b*, 10*c*. The head-rest-support-tube is first positioned into a punch unit 75. The top end 76 of the head-rest-support-tube abuts against a shoulder 78 of the punch 79, and the already-formed first ring-bead 72 abuts against the bottom face of the punch-holder 80.

As shown in FIG. 10*b*, the head-rest-support-tube passes through the hole 63, and the tapered bottom end of the head-rest-support-tube enters the recess 82 in the die 83. As the punch 75 and die 83 approach, the bottom end of the head-rest-support-tube abuts against the bottom of the recess 82. From then on, further approaching movement of the punch and die are reacted as an axially-directed compressive force on the head-rest-support-tube. The compressive force is enough to cause the walls of the head-rest-support-tube to buckle outwards, whereby the second ring-bead 84 is formed. Approaching movement of the punch and die continues until the condition of FIG. 10*c* is reached.

The punch and die are then withdrawn, and the seat-frame-tube 50, with the head-rest-support-tube 68 now firmly attached, can be transferred to the next stage in the manufacture of the seat.

The manner of attaching the head-rest-support-tube into the seat-frame-tube ensures that the web 60 is structurally unitary with the head-rest-support-tube. The first and second ring-beads 72,84 grip the web between them, providing a secure base for resisting abusive forces from any direction, which might tend to disrupt the attachment.

By forcing the punch unit 75 and the die 83 hard together (FIG. 10*c*) the amount of spring-back upon release can be made very small, whereby the compressive grip on the web is still firmly present upon release.

The manner in which the dies bottom together may be explained further, as follows.

To manufacture the first ring-bead in the headrest-support-tube, the tube is placed between a pair of dies, which apply compressive force to the tube via the top-end-surface and the bottom-end-surface of the tube. That is to say, the whole length of the tube is in compression. The dies are so shaped as to include an annular recess at the location where the ring-bead is to be formed. As the dies are forced together, the tube collapses axially, and the walls expand radially outwards, into the recess. The tube is now taken out of the dies in which the first ring-bead was formed. With its one ring-bead, the headrest-support-tube looks like FIG. 9.

The headrest-support-tube, with the first ring-bead formed thereon, is placed in the through-hole that has already been punched through the web of the I-section of the top-rail (which can be either an I-beam itself, or a round tube that has been locally formed into an I-beam configuration). The dies are arranged so that the already-formed first ring-bead abuts a shoulder in the upper die; the lower die abuts the headrest-support-tube at its lower-end-surface.

As the dies are pressed together, the tube expands into the recess that is formed between the upwards-facing shoulder on the lower die, and the undersurface of the web, to form the second ring-bead.

Once the metal of the tube starts to expand into the recess, and to form upper and lower wall portions of the second ring-bead, so the upwards-facing shoulder on the lower die starts to compress the upper and lower wall portions of the second bead together, and to compress the second bead itself, between the shoulder and the under-surface of the web.

The ring-beads now form a stack, which is under the compression of the die-set. That is to say, the downwards-facing upper-die-shoulder lies flat against the upwards-facing outside surface of the upper-wall-portion of the 1st ring-bead; the downwards-facing inside surface of the upper-wall-portion of the 1st ring-bead lies flat against the inside surface of the lower-wall-portion of the 1st ring-bead; the downwards-facing outside surface of the lower wall portion of the 1st ring bead lies flat against the upwards-facing surface of the web of the top-rail; the downwards-facing surface of the web of the top-rail lies flat against the upwards-facing surface of the upper-wall portion of the second ring-bead; the downwards-facing inside surface of the upper-wall-portion of the second ring-bead lies flat against the upwards-facing inside surface of the lower-wall-portion of the second ring-bead; and the downwards-facing outside surface of the lower-wall-portion of the second ring-bead lies flat against the upwards-facing lower-die-shoulder.

The surfaces, one on top of another, lie in series and form a stack. The dies are arranged so that the compressive force delivered by the dies is applied to that stack. The designer should see to it that nothing else in the dies bottoms, in such manner as to prevent the full force with which the dies are brought together from being applied to the stack of surfaces.

The force applied to the surfaces is enough to crush and deform the metal, whereby any (slight) promontories or crannies in the surfaces are crushed, and the surfaces are brought into conformance with each other. The surfaces are crushed and squashed together so hard that, when the force is released, the surfaces substantially do not spring apart and separate. Of course, given that the force is released, the surfaces must relax to some extent: the point is that the force with which the dies are pressed together is large enough for the surfaces to be crushed so hard together that the metal forming the surfaces is permanently deformed. Permanent deformation occurs when the metal has been compressed to its elastic limit, and the metal is also under a heavy elastic deformation.

With the configuration of the surfaces as depicted, it has been found that the stored resilient compression of the metal, at the time the permanent deformation of the surfaces takes place, is enough to retain a compressive force between the ring-beads and the web. Thats is to say, when the die force is released, and the surfaces tend to spring apart, there is enough resilient energy stored in and locked into the stack, that the surfaces do not actually separate, but remain under compression, whereby the headrest-support-tube remains locked firmly to the top rail of the seat frame, and does not tend to work loose.

The head-rest-support-tube might be subjected to forces tending to rotate it, during use of the automobile, and it is important that rotation forces are resisted. If rotation of the head-rest-support-tube were to be permitted, the movement might cause the attachment to rattle or work loose. Accordingly, the designer might prefer to make the hole 63 in the web slightly non-circular. In fact, given the fact that the hole occupies a large area of the tube, it is all too easy for the hole 63 to be non-circular in any event. The operation of forming the second ring-bead 84, however, ensures that the head-rest-support-tube adapts itself completely to whatever out-of-roundness there might be in the hole 63, which helps to ensure freedom from rotation of the head-rest-support-tube.

The attachment system as described is very strong, as compared with the conventional welded construction, but apart from that clear advantage, the attachment system provides excellent and repeatable accuracy. Now that accuracy of alignment of the two head-rest-support-tubes can be relied upon, the design of the head-rest detents can be free of the compromises needed with the conventional welded attachment; designing a detent is a matter of making sure the force to move the head-rest pegs against the detent is neither too light nor too heavy, and the more accurately the components can be positioned, the easier it is to ensure the correct force.

Not only is the attachment system as described very strong, and accurate, but the system also lends itself to full automation. The attachment system is in keeping with the kinds of operations that have to be carried out on seat-frame-tubes, such as bending, piercing, etc, and the machinery for automating such operations is already commonplace. The similarity of those frame-tube operations with the operations required in the attachment system will be clear: the dissimilarity of the frame-tube operations with the conventional welding attachment system, is even more clear.

The expressions upper, lower, horizontal, vertical, etc, as used in this specification, should not be interpreted to mean that the invention only applies when the actual physical components used in operating the invention are orientated in only that way. Rather, the expressions should be taken as referring to those directions when the components are represented on paper, which is oriented accordingly.

It has previously been described that the first ring-bead preferably is applied to the headrest tube prior to the headrest tube being inserted into the through-hole in the top rail of the seatframe. Alternatively, the headrest tube may be plain—that is to say, the headrest tube may have no pre-formed ring-bead—at the time when the headrest tube is inserted into the through-hole of the seatframe. In that case, both ring-beads are formed in the headrest tube, in situ on the seatframe, after the headrest tube has been assembled into the seatframe.

FIGS. 12*a*-12*c* show a punch-set 120 designed for creating a lock-beaded joint, where neither of the ring-beads is pre-formed. In FIGS. 12*a*-12*c*, the upper-punch 123 comprises an upper-inner-punch 124 and an upper-outer-punch 125. The lower-punch 126 likewise comprises a lower-inner-punch 127 and a lower-outer-punch 128. The upper-punch 123 is arranged so that either the upper-inner-punch 124 and the upper-outer-punch 125 can move in unison or the upper-outer-punch 125 can move relative to the upper-inner-punch 124. Similarly, the lower-punch 126 is arranged so that either the lower-inner-punch 127 and the lower-outer-punch 128 move in unison or the lower-outer-punch 128 moves relative to the lower-inner-punch 127.

In FIG. 12a, the upper-outer-punch 125 and the upper-inner-punch 124 are locked together, and are just starting to be forced downwards, whereby the unconstrained portion 129 of the headrest tube 130 is just starting to buckle outwards. The lower-outer-punch 128 has already been extended upwards, so that its nose 132 lies in contact with the web 134 of the seatframe 135. The nose 132 of the lower-outer-punch 128 constrains and prevents the portion 136 of the headrest tube 130 from buckling outwards, at this time. This arrangement of the punches means that only one ring-bead can start to form, being the upper ring-bead, which will created from the outwardly buckling portion 129.

So far, the lower-inner-punch 127 and the lower-outer-punch 128 have been held stationary. But now, at a point when the upper ring-bead is almost fully formed (although the upper and lower walls thereof have not yet been finally squeezed together), the lower-outer-punch 128 is withdrawn (i.e is moved downwards). The lower-inner-punch 127 is not withdrawn. Then, the lower-inner-punch 127 and the lower-outer-punch 128 are driven upwards, in unison.

The now-unconstrained region 136 of the headrest tube 130 starts to buckle outwards. This is the condition shown in FIG. 12b. At this point, the upper-ring-bead is sufficiently formed as to be able to react and resist the forces acting on the headrest tube, causing the portion 136 of the headrest tube to collapse, leading to the creation of the lower-ring-bead. Therefore, the top end 137 of the headrest tube 130 no longer needs to contact the upper-inner-punch 124, and the upper-inner-punch can be withdrawn, leaving a gap 140.

While the lower-ring-bead is being formed, as in FIG. 12b, the upper-outer-punch 125 may be held stationary, and the forces on the headrest tube arising from the upwards movement of the lower-punch 126 are reacted and resisted by the nose 142 of the upper-punch 123 abutting the partly-formed upper-ring-bead.

As upwards movement of the lower-punch 126 continues, the lower-ring-bead becomes partially formed, until it is in a condition that is approximately identical to that of the upper-ring-bead. At this time, the lower-inner-punch 127 can be withdrawn (downwards). Now, both ends of the headrest tubes are clear of the inner-punches 124,127. Further closure of the upper and lower punches results in both ring-beads being completed, and formed to the final finished configuration, as in FIG. 12c.

It should be understood that the seatframe is mounted in a jig or fixture, which holds the web of the seatframe in position relative to the usual travel-limit stops incorporated into the operational sequencing of the punch-set 120. It will be noted that the above sequence of operations saves the web 134 of the seatframe from being subjected to the forces derived from the punch, during the initial forming of the ring-beads. The punch forces pass through the web, but the forces are reacted by the punches themselves, not by the web. Only when the ring-beads have been more or less fully formed (i.e both ring-beads to the condition of the upper ring bead as shown in FIG. 12b) is the web exposed to the full force of the punches, and the remaining travel of the punches from that point is very small. Thus, the forces acting on the web tending to distort the web up or down, are minimal, even though the forces tending to compress the web between the ring-beads may be very large.

The force acting on the punches that was required in order to cause the headrest tube to buckle outwards, as shown in FIGS. 12a and 12b was relatively modest. Once all the bucklings and distortions of the headrest tube have been taken up, at the relatively low force, now the condition of FIG. 12c is reached. At this point, the full force of the punch press can be directed into forcefully compressing, or coining, the flattened ring-beads onto the web, and the force at this time may be several times greater than the force exerted in the FIGS. 12a and 12b stages.

It is when the ring-beads are being finally squeezed flat, onto the web, that the punch forces become very large. It will be noted that the inner-punches 124,127 can be withdrawn at this time, whereby those portions of the headrest tube that are not included in the ring-beads are not subjected to the very large forces. This is advantageous from the standpoint of stripping the headrest tube out of the punches after the ring-beads have been formed.

Alternatively, the upper-punch may be provided as just a single solid (female) punch, i.e there is no relatively-movable inner-punch 124. In that case, the upper portion of the headrest tube will become jammed very tightly in the upper-punch, but that can be accommodated if suitable stripping facilities are provided.

Alternatively again, the lower-punch may also be provided as just a single solid female punch. However, that is not so easily accommodated, as will now be described. As shown in FIG. 13, (in which the punches are both in two parts), the two ring-beads start to balloon outwards simultaneously. Inevitably, the upper ring-bead will form at a different rate from the lower ring-bead, and this difference might tend to move the web 143 away from its central location between the two punches.

This should be compared with FIG. 12a, in which the nose 132 of the lower-punch remained in position, supporting the web 134, and holding the web in its correct central position, until the upper ring-bead was (almost) fully formed. But this support for the web 143, while the first ring-bead is being formed, is not present in FIG. 13. In FIG. 13, the designer might provide a mechanical gearing-together arrangement whereby the upper and lower punches are brought together at the same rates of travel relative to the web, although even that would not completely equalise the forces acting on the web.

So, it is preferred that the two ring-beads not be formed simultaneously, as in FIG. 13, but rather that the first ring-bead is formed while the web is supported, e.g by the punch on the opposite side of the web, and then the second ring-bead is formed while the web is supported, e.g by the first ring-bead and by the punch that supports the first ring-bead.

Thus, when forming the upper ring-bead (in FIG. 12a), preferably the web of the seatframe is held against the lower-punch, which is held against a travel limit stop in the punch press. Then, for forming the lower ring-bead, preferably the web rests against the partially-formed first ring-bead, and the web thereby rests against the upper-punch, and the upper-punch is held against a travel limit stop in the punch press. Preferably, it is only when both ring-beads have been almost fully formed that both the upper and lower punches then become free to float relative to the web 134. So, when both punches are, at last, free to float, the remaining travel is very small; so now, the large forces needed to finish off the ring-beads, and to form a secure lock-beaded joint, can be exerted without danger of distorting the web.

If both ring-beads are formed simultaneously, as in FIG. 13, the danger of distorting the web is quite high. Providing mechanical gearing (or hydraulic "gearing"), so the punches both move at the same rate, might alleviate that danger somewhat, but (partially) finishing one ring-bead before starting the other, as in FIGS. 12a-12c is the preferred measure. That is to say, even though both ring-beads are formed in situ, it is better for one ring-bead to be almost fully formed before the other ring-bead is started.

FIGS. 12a-12c show the formation of the two ring-beads when the seatframe 135 is an aluminum I-beam extrusion. The manner of forming the two ring-beads may equally be applied when the seatframe is an aluminum section, or is a hollow steel tube, squeezed flat locally in the region where the headrest tubes are attached.

In the invention, the headrest tube lies in a through-hole in the top rail of the seatframe, whether the seatframe is an aluminum extrusion, or a hollow steel tube, or is of some other structure. Although it is preferred that the through-hole in the seatframe be made by punching the hole, using a punch and die set, other ways of making a through-hole may be utilised. For example, the through-hole may be cut using a laser beam. Or, the through-hole may be drilled. One of the restrictions that applies when the through-hole is punched (perhaps more so than when the through-hole is e.g drilled) is that the associated die must give solid support to the material of the seatframe, in the area immediately surrounding the through-hole; if the die does not give solid support, the hole produced by the punch is likely to be ragged and ill-formed. When punching a hole right through the two opposite walls of a hollow tube, therefore, the hollow tube should be squashed, so the two walls are touching internally, before the necessary solid support from the die can be applied equally to the two walls.

Thus, in the case where the seatframe is formed from a hollow tube, and where the through-hole in the seatframe tube is to be formed by punching, it is almost essential, unless the headrest tube is of a very much smaller diameter than the seatframe tube, that the seatframe tube has to be squashed flat, i.e the two opposing walls of the seatframe tube make touching contact, internally, before the through-hole can be made through the two opposing walls.

However, when the through-hole is being made by drilling, and even more so when the through-hole is being made by laser-cutting, it is possible for the through-hole to be made without squashing the seatframe tube flat. It may be noted that squashing a tube flat detracts greatly from the rigidity of the tube; if a squashed-flat tube is subjected to high stresses, it might start to distort or buckle at the point where it has been squashed flat. That of course is a disadvantage in the case of an automotive seatframe, and the designer must see to it that even emergency loads applied to the top rail of the seatframe do not cause the seatframe to buckle. Therefore, where the seatframe is a hollow steel tube, the designer will generally prefer to secure a headrest tube into the hollow tube without squashing the tube flat.

Some ways in which the headrest tube may be lock-beaded to a hollow steel seatframe tube will now be described, in which the seatframe tube is not squashed flat, i.e not squashed flat to the extent that the opposing walls of the tube come to touch internally. In FIGS. 14a,14b, the through-holes in the seatframe tube may be formed by drilling, or by laser-cutting (or even by punching if the punching can be done without the opposite walls being squashed together), or by some other hole-making process that does not require the walls to be touching internally.

As shown in FIG. 14a, a hollow round tube 145 forms the top rail of a seatframe. The tube 145 is compressed a little, as shown, prior to the through-holes being drilled, but the tube 145 is not squashed flat. FIG. 14a shows the condition when the upper and lower punches 146,147 are just starting to be squeezed together. The walls of the headrest tube 148 are just starting to buckle, under the axial compression of the headrest tube. As shown, the headrest tube 148 is starting to buckle, not only, as before, in the upper un-constrained portion 149 between the upper wall 150 of the seatframe tube 145 and the upper-punch 146, and in the lower un-constrained portion 152 between wall 153 of the seatframe tube 145 and the lower-punch 147, but also in the un-constrained portion 154 between the upper-wall 150 and the lower-wall 153, inside the seatframe tube 145. Thus, three ring-beads are being formed.

FIG. 14b shows the final stages in the formation of the three ring-beads. The three ring-beads are being squeezed flat between the shoulders 156 of the upper and lower punches 146,147. Again, the punch force that can be exerted onto compressing the ring-beads and the walls of the seatframe tube together, as in FIG. 14b, may be several times greater than the punch force needed to buckle and deform the headrest tube, as in FIG. 14a.

In the variation shown in FIG. 15, only two ring-beads are present, but one ring-bead 157 thereof lies between the walls of the seatframe tube 158. This variation may be preferred in some cases.

FIGS. 16a, 16b show an alternative manner of forming a third ring-bead, inside the seatframe tube. Again, the through-hole in the seatframe tube 159, for receiving the headrest tube 160, should be formed by a process, such as drilling, that does not require the seatframe tube to be flattened. In this case, the portion 162 of the headrest tube 160 that lies inside, i.e between the walls of, the seatframe tube 159, as the portion 162 buckles outwards, makes contact with the inside surfaces of the walls of the seatframe tube.

In FIG. 16a, the walls of the seatframe tube 159 are held against collapsing and buckling, in their turn, by the presence of a die 164. The die is configured according to the desired finished profile of the seatframe tube, as shown in FIG. 16b. However, even though constrained by the die 164, it will be understood that the seatframe tube 159 would collapse if subjected to very high punch forces. Therefore, the outside ring-beads 165 cannot be so firmly and tightly coined onto the seatframe tube, in FIGS. 16a, 16b as was possible in the previous examples. (The headrest tube 160 is omitted from the plan view, FIG. 16b.)

It has been mentioned that the seatframe may be formed either as a hollow steel tube, or as an I-beam-shaped extrusion in aluminum. Other configurations may alternatively be used. For example, in FIG. 17, the headrest tube is lock-beaded to an extruded aluminum channel-section seatframe. In FIG. 18, the headrest tube is lock-beaded to an extruded aluminum T-section seatframe. In FIG. 19, the headrest tube is lock-beaded to an extruded aluminum angle-section seatframe.

From the standpoint of the invention, the seatframe section need not be symmetrical. The extrusion may include hooks or other forms, which the designer provides for such purposes as e.g securing components to the seatframe other than the headrest tubes. The designer of the cross-section should bear in mind what form of the section as presented to the seat occupant during an accident will cause what degree of injury, whereby the non-symmetrical sections, such as the angle-and T-sections, may be favoured.

When the seatframe is a hollow steel tube, the opportunities for the seatframe to be of a non-symmetrical cross-section are less, but again, securing the headrest tube to the seatframe by means of lock-beading, as described herein, does not depend on whether the cross-section of the seatframe is symmetrical.

When the seatframe is a hollow steel tube, the tube need not be round, as to its cross-sectional form. Furthermore, the headrest tube need not be round. The ring-beads can be formed, by axially punching the headrest tube, even when the headrest tube is of a cross-section other than round. Of course, the ring-beads in that case will not be round either.

Alternatively, the designer may prefer that the headrest tube be formed as a non-closed circle; that can arise when the headrest tube is formed by wrapping a sheet of steel around a cylindrical former, and when the edges of the sheet simply abut. The resulting not-closed circle (or rather, not-closed cylinder) can serve as a headrest tube. Of course, the ring-beads cannot be fully formed in the region of the circumference where the edges of the sheet abut, but the ring-beads can be complete over the rest of the circumference.

One of the reasons lock-beading is favoured as a manner of attaching the headrest tube to the seatframe, is that flanges associated with the cross-sectional shape of the seatframe do not interfere with the production operation of lock-beading. In lock-beading, the headrest tube is punched axially, whereby the presence of flanges on the seatframe makes hardly any difference to the accessibility of the joint area. With other systems for joining headrest tubes to seatframes, the presence of flanges on the seatframe would pose a major difficulty. Even just one flange (as in the case, for example, of the extruded angle-section) can pose a difficulty of access to the joint area, in other systems for joining headrest tubes to seatframes.

If there were no flange at all, i.e if the seatframe were to be simply a flat plate, or a flat web, with no flanges, the lock-beading jointing system could still then be used. But so could many other jointing systems in that case. But when the seatframe has no flanges at all, but is simply a flat plate, the designer would have to be very careful that the seatframe is strong enough and rigid enough; the seatframe must not be liable to twist or buckle in an accident in a manner that might cause extra injury to an occupant of the seat. Thus, seatframes generally do have flanges, as to their cross-sectional shape, and it is recognised that lock-beading is highly suitable for use when the seatframe is of the flanged shape.

When the seatframe is flanged, lock-beading is one of the few jointing systems that can provide a joint of secure strength, in a manner that is not only economical but is highly repeatable over a long production run. Even when the seatframe is flanged, lock-beading can be more or less fully automated.

When an extruded aluminum seatframe is flanged at the point where the headrest tubes are attached, of course the seatframe is uniformly flanged all along its length. When the seatframe is a hollow steel tube, the flanging configuration is not uniform. Away from the headrest joint, the seatframe is simply a round (un-flanged) tube. When the seatframe is a hollow tube, it is only in the vicinity of the point of attachment of the headrest tube that the seatframe assumes a flanged shape. The flanged shape of the tube arises, in that case, because the seatframe tube has been squashed, whereby the opposing upper and lower walls of the seatframe tube touch together internally; the touching areas form a web, and the un-squashed regions, beyond the central squashed web, form the flanges.

When the seatframe is a hollow steel tube, it might be contemplated that the seatframe tube may be squashed completely flat, and thereby be not flanged. In this case, the designer would be concerned at the resulting lack of rigidity at the joint. Squashing the hollow seatframe tube flat is not preferred, since it does not give any improvement in access, and makes the seatframe more likely to distort dangerously in an accident. But if those things can be accommodated, the designer may decide to squash the hollow steel seatframe tube flat, at least in the immediate vicinity of the place where the headrest tube is joined. FIG. 20a is a section on line A-A of FIG. 20b, which is a side view of a seatframe tube 167 to which this has been done.

It will be noted from FIG. 20b that, even though the tube 167 has been squashed flat, still there is little access to the joint area for any jointing system other than lock-beading. It will also be noted from FIG. 20c, which is a section taken on line C-C a little way from the centre of the joint, that the hollow seatframe tube 167, although having a squashed-flat-right-across configuration in the centre of the joint (FIG. 20a), in fact does have a flanges-plus-web cross-sectional configuration at the FIG. 20c location. (The headrest tube 166 has been omitted in FIG. 20c.)

As mentioned, squashing a hollow steel seatframe tube flat at the point of attachment of the headrest tube is not preferred. However, sometimes, it is unavoidable. So, to reinforce the seatframe tube, a reinforcing-tube may be inserted into the seatframe tube. The reinforcing-tube is then squashed flat, while the seatframe tube is squashed over the reinforcing tube. In that case, the through-hole for the headrest tube is pierced through four wall thicknesses, rather than through two, and the ring-beads are squeezed down onto the four thicknesses.

When the seatframe is formed as an extrusion in aluminum, the cross-section of the seatframe is the same all along its length. Therefore, the flanged shape appears only in a cross-section taken laterally across the seatframe. A cross-section taken along the length of an extruded seatframe would not show any flanges at all. But when the seatframe is formed as a hollow steel tube, a cross-section taken along the length of the seatframe, through the point of attachment of the headrest tube, does exhibit the web-plus-flange configuration. This is true even if a hollow tubular seatframe is squashed quite flat, right at the centre of the headrest tube, whereby the web-plus-flange configuration is not present in the lateral cross-section of the seatframe (FIG. 20a). Thus, the seatframe tube as shown in FIG. 20b does display the web-plus-flange configuration, even though the FIG. 20a cross-section does not.

The web-plus-flange configuration arises in respect of the upper and lower walls of the seatframe tube, around the lock-beaded headrest tube. Between the upper and lower ring-beads, the upper and lower walls of the seatframe tube are touching together, in direct contact, and the upper and lower walls together thereby form the web of the lock-beaded joint. As may be seen in FIG. 20b, the radial extent of the touching contact is roughly co-extensive with the radial extremities of the ring-beads. Beyond that, the upper and lower walls of the seatframe tube spread apart, thereby forming the flanges of the lock-beaded joint.

It is preferred, from the standpoint of making a strong and rigid joint, that the upper and lower walls of the seatframe tube should start to spread apart as soon as the walls are clear of the lock-beading area, as shown in FIG. 20b. Having the walls of the seatframe tube still together, some radial distance away from the headrest tube, would cause the joint to lose some rigidity. Thus, the annular marginal area of the seatframe web, in which the upper and lower walls of the seatframe tube come together in direct contact, preferably should be kept to a minimum, i.e the flattened annular margin, being the area of internal contact between the upper and lower walls of the seatframe tube, should not extend beyond the diameter of the ring-beads.

FIG. 21 shows a situation where a ring-bead 168 is formed in the headrest tube 173, on the underside of web 169 of the seatframe rail 170. But on the top side of the web, the whole top portion 172 of the headrest tube 173 has been expanded, or belled-out, leaving a shoulder 174 as the counter to the ring-bead 168. This belled-out portion can be preferred with some types of headrest pins, in which e.g a pin adjustment mechanism is included, and the mechanism is housed and accommodated within the belled-out portion 172.

The belling-out may be done by means of a male punch 175. It will be noted that the punch-shoulder 176 on the male punch can cooperate with the nose 178 on the female punch 179 underneath the web 169, the two punches being pressed together hard to finish off the joint. This arrangement may not be so strong as providing two ring-beads, and squeezing them hard together, onto the web, but it may be used when the (slight) loss of integrity of the joint is outweighed by the presence of the belled-out portion.

FIG. 22 is similar to FIG. 21, except that the seatframe is now formed from a hollow steel tube, as opposed to the extruded aluminum I-beam section shown in FIG. 21. (Of course, this equivalence can be applied to many of the other embodiments as depicted herein.)

FIG. 23 is similar to FIG. 22, except that the belled-out portion is now created using a female punch 180, in place of the male punch. The following points should be noted in relation to FIG. 23.

As mentioned, in lock-beading, it is preferred that, when the ring-bead has been almost fully formed, a very heavy compressive (coining) force then is applied to the ring-bead. The ring-bead being almost fully formed, at this time the axially-facing outside surfaces of the ring-bead are in contact, one with the nose of the punch and the other with the annular margin surrounding the through-hole in the web of the seatframe. Thus, applying the heavy compressive force between the punch and the web coins the ring-bead tightly against the web. Applying the heavy force also forces the inside surfaces of the walls of the headrest tube, inside the ring-bead, to be compressed together, into tight touching contact.

In the previous embodiments, where two ring-beads were provided, one each side of the web, the two ring-beads were coined simultaneously, to form a stack of surfaces, all heavily compressed together. Coining the stack of surfaces together in this manner ensures, when the seatframe is removed from the die-set, not just that there is no slack remaining between the surfaces, but that the joint is left in a highly secure and rigid condition, and suitable for a long service life. If this coining of, i.e application of very heavy force to, the ring-beads is omitted, there can be a danger that the joint might have some detrimental looseness, or might later work loose.

In order for the ring-bead on one side of the web to be coined, there must be an abutment on the other side of the web, against which the heavy force can be reacted. In the previous embodiments, this abutment was provided by the second ring-bead, which in turn was abutted against the nose of the second punch. In FIG. 21, this abutment on the other side of the web from the ring-bead, was provided by the shoulder 176 of the male punch.

But in FIG. 23, in which the upper punch 180 is female, of course such a shoulder cannot be provided. So, the reaction to the very heavy forces associated with coining now have to be reacted axially through the wall 182 of the belled-out portion of the headrest tube, and thus against the abutment surface of the punch 180. The fact that the wall 182 might crumple and collapse (inwards), under a heavy force, limits the magnitude of the force that can be applied to the shoulder 184 of the headrest tube 185, and thus limits the coining force that can be applied between the shoulder 184 and the web 186, and indeed between the lower ring-bead 187 and the web 186.

Thus, in FIG. 23, the magnitude of the coining force that can be applied is limited. The designer should ascertain (e.g by development testing) whether this will be a problem, before deciding to use the FIG. 23 arrangement—or before deciding to use another arrangement in which, as in FIG. 23, only a reduced coining force can be applied. On the other hand, in some cases, it might be found possible that the lock-beaded joint can be secure enough, for a particular installation, even though the joint is coined with only a relatively light force, or is barely coined at all. In that case, if only light (or no) coining is required, the designer might be able to take advantage of the reduced demands on the punches and tooling, to provide extra versatility in the finished shape of the headrest tube.

However, it should be understood that, in most automotive seating applications, a lock-beaded joint between the headrest-tube and the seatframe must be coined very heavily—that is to say, coined with a force that is several times greater than the force needed just to deform the metal of the headrest tube roughly into a ring-bead configuration.

As mentioned, one of the benefits of lock-beading the headrest tube to the seatframe is that lock-beading produces a joint of very secure strength and rigidity, even though the joint configuration permits access to the joint area only from the axial direction (i.e axial relative to the headrest tube). Another benefit may be explained as follows. In an automotive context, it is important not only that a structure have integrity, but that the integrity of the structure can be simply assured. If a structure can only be checked by testing it to destruction, that is not preferred.

The lock-beading technique for jointing a headrest tube to a seatframe not only provides a secure joint, but provides a ready means whereby the joint may be automatically inspected and tested. As mentioned, the force exerted by the punch press when squeezing the ring-beads tight, and flat against the web of the seatframe, is considerably larger than the force needed to cause the metal of the headrest tube to balloon outwards, as the ring-beads are being formed. An indication that the joint has been made properly is the fact that this large force has been exerted on the joint. It is a simple matter for a sensor to detect whether a press force in excess of a predetermined magnitude has been applied to the joint; and the designer can arrange that the workpiece is accepted only if the force has been applied. If for any reason the large force was not applied to a particular workpiece, then it is rejected.

Detecting whether a certain force has been applied to the joint, as a way of checking the joint's integrity, is simple, yet effective. Such a test is acceptable by automotive standards, in that the chance of a joint being defective is very small, if the joint has had the large force applied to it. The lock-beading technique permits this simple and reliable (and automatic) test. The test can be expected to remain accurate and repeatable over a long production run.

In place of detecting the applied force, the designer may prefer to provide a sensor for checking the finished length of the headrest tube. If the tube is less than a predetermined length, it can be assumed that the joint has been properly lock-beaded, and has the required degree of integrity. However, usually, the designer will prefer sensing the force applied to the headrest tube over sensing the finished length of the headrest tube.

Another benefit that arises from the use of the lock-beading technique for jointing a headrest tube to an automotive seatframe may be explained as follows. Generally, an automotive headrest structure is secured into the seat by two pins; thus, the headrest tubes are provided in pairs, one for each pin. If the spacing and parallelism of the two headrest tubes relative to each other can be assured, some of the traditional design compromises in the headrest may be eased. Lock-beading permits the provision of such assurance.

The benefits of lock-beading a pair of headrest tubes into a seatframe are not just that the headrest tubes may be accurately jigged, and the two headrest tubes may be affixed in one operation. The benefits of lock-beading also include the fact that lock-beading provides an automated mass-production jointing system in which, when the seatframe with the two headrest tubes is taken out of the jigs, the structure does not distort, but rather the two headrest tubes remain accurately located positionally relative to each other, and accurately parallel. (This may be contrasted with e.g welding two headrest tubes to a seatframe; now, the designer must cater for the fact that the welded seatframe will distort, and will distort somewhat unpredictably, after being released from the jigs.)

In some cases, one seatframe serves for two seats, side by side, and in that case, four headrest tubes may be fixed into one seatframe rail. Lock-beading provides the same accuracies in respect of all four headrest tubes.

In that case, it is preferred, not necessarily that the headrest tubes be punched simultaneously, but at least that the seatframe should remain fixed in the same jig location while the two headrest tubes are punched. Thus, it would not be preferred for the headrest tubes to be punched one at a time, all from the same punching station, the seatframe being indexed though the station so that each headrest tube comes under the punch in turn.

As mentioned in relation to some of the earlier drawings, the first ring-bead on the headrest tube may be formed, and finished, before the headrest tube is inserted into the through-hole in the seatframe. And, as mentioned, alternatively, both ring-beads may be formed in situ; in that case, even though both ring-beads are being formed in situ, it is preferred that the ring-beads not be formed simultaneously, but that one ring-bead be almost fully formed before the other ring-bead is started.

Forming the ring-beads one at a time enables the web of the seatframe (whether extruded section or hollow tube) to be safeguarded from being deformed during lock-beading; however, forming the ring-beads one at a time does require that at least one of the female punches be in two components (i.e the inner and outer punch components) that are relatively movable axially. Thus, the two-part punch is provided in order to enable the web to remain central as the ring beads are being formed. But having a withdrawable inner punch component means that, when the ring beads are being finally, and very heavily, compressed, only the ring-beads, and not the whole headrest tube, is subject to the heavy compression, which simplifies stripping the headrest tube from the (female) punches.

Spurious forces tending to distort the seatframe can arise also during stripping the lock-beaded joint off the punches. The designer should see to it that suitable stripper plates are provided, if necessary, which enable the seatframe to be stripped from the punches without distortion.

Although not shown in the drawings, the female punches may be provided with a central rod or post, which passes down the centre of the headrest tube. The post is a clearance fit on the inside of the headrest tube. The post generally serves no purpose, except that if a particular headrest tube should happen to be liable to collapse inwards, due to a fault in the material, or a misalignment, etc, the post can prevent such inwards buckling, and can thereby save an assembly that would otherwise have to be scrapped.

It should be understood that, at least in respect of FIGS. 14*b*,16*a*, 20*b*, which actually depict forming both ring-beads in situ, the illustrated structure could also have been achieved if one of the ring-beads had been pre-formed, i.e formed before the headrest tube was inserted into the through-hole in the seatframe tube.

When both ring-beads are formed in situ, as mentioned it is preferred that the ring-beads not be formed simultaneously, but that the tooling be arranged so that one ring-bead be almost fully formed before the other ring-bead is started. Then, when both ring-beads are almost fully formed, the two ring-beads can be squeezed very tightly together, the web of the seatframe trapped between, thereby lock-beading the headrest tube to the seatframe.

It has also been mentioned that it is preferred that the (female) punches be in two components, to enable the final large coining forces to be applied just to compress the ring-beads, and not to compress the whole length of the headrest tube. However, it is often possible to mass-produce satisfactory seatframes with lock-beaded headrest tubes, using simple punches and forming both ring-beads in-situ, and at the same time.

FIG. 24 shows such simple tooling. A through-hole has previously been punched (or drilled, etc) in the web 190 of the seatframe. The plain (i.e not yet beaded) headrest tube 192 is placed in the through-hole, and the sub-assembly comprising the seatframe and the headrest tube (or rather, the seatframe and both, or all, the headrest tubes relating to that seatframe) is held in a jig 193, ready for presentation to the upper and lower female punches 194,195. The designer can arrange for the headrest tubes to be assembled into the through-holes in the seatframe either before or after the seatframe is assembled into place in the jig.

The lower punch 195 is fixed in the press. The upper punch 194 descends, and compresses the headrest tube 192. The headrest tube becomes shorter, as it balloons outwards, and the ring-beads start to form.

It will be understood that, when the ring-beads have been fully formed, the headrest tube 192 is considerably shortened—and the upper punch 194 has moved downwards the same distance as the distance of shortening. Also, the seatframe 190 has moved downwards, by approximately half the distance moved by the upper punch 194. The jig 193 in which the seatframe is mounted should be structured to accommodate this downwards movement of the web. As shown (diagrammatically) in FIG. 24, the jig 193 includes a stop 196 and a spring 197, whereby the seatframe clamp 198 can move downwards with the seatframe.

It may be noted that, once the headrest tube 192 has just started to balloon out (i.e the condition shown in FIG. 24) the headrest tube is now locked tightly into the web 190 of the seatframe, and it would take a considerable force, now, to cause the headrest tube to slide axially relative to the seatframe. Thus, once ballooning has started, the seatframe will tend very strongly to move downwards, following the movement of the collapsing headrest tube. Thus, the jig 193 need only follow this movement of the seatframe; the jig need not constrain the movement—by being geared to the upper punch, for example.

The upper and lower ring-beads on a headrest tube should be, at least approximately, the same size. In other words, the jig 193 should be arranged to place the seatframe web halfway between the upper and lower punches in the FIG. 24 condition.

Alternatively, the jig may be arranged to hold the seatframe tube in the correct position relative to the punches, but, as soon as ballooning has just started, the jig may be released, allowing the seatframe to follow its own movement.

Alternatively again, it may be arranged that the seatframe and its jig do not move at all, but that both punches move relative thereto. The important aspect is that the punches make the headrest tube collapse, creating respective ring-beads, each side of the web of the seatframe.

The above points about FIG. 24 apply also when the top rail of the seatframe is of extruded aluminum of a section other than an I-beam, and apply also when the top rail of the seatframe is a hollow steel tube.

FIG. 25 shows a headrest joint in which the lower ring-bead is pre-formed. The punches and dies are then arranged such that the headrest tubes collapses outwards into contact with the walls of the seatframe tube. The walls of the seatframe tube are prevented from expanding outwards by the presence of the dies. This arrangement can be adequate, at least when the diameter of the seatframe tube is only a little larger than the diameter of the headrest tube.

What has been termed the coining of the almost fully-formed ring-beads will now be described further. It will be understood that both ring-beads could be left in the not-fully-compressed configuration, as shown for example in respect of the upper ring-bead in FIG. 12*b*. It will be understood that even such loose ring-beads will, at least, not fall out of the seatframe. However, the mere fact that the headrest tube is present in the seatframe is, generally, not enough; the joint must be tight, and must remain tight over a long service life. It is recognised that such residual tightness cannot practically be achieved unless the ring-beads are coined very hard onto the web.

The ring-beads are formed from the walls of the headrest tube. Each ring-bead, once formed, has an upper-wall and a lower-wall. The ring-bead is coined by pressing the upper-wall and the lower-wall together with enough force that the down-facing surface of the upper-wall of the ring-bead, is driven into tight touching contact with the up-facing surface of the lower-wall of the ring-bead.

In the case of a typical steel headrest tube, having an outside diameter of 20 mm, a press force of a few tonnes is required in order to make such a tube collapse and balloon out. Once the ring-bead has become almost fully formed, now the down-facing surface of the upper-wall of the ring-bead starts to make contact with the up-facing surface of the lower-wall of the ring-bead. Now, the ring-bead is almost fully closed, and now, much larger forces can be applied. Preferably, the designer should arrange for the press to exert a coining-force that is several times greater than the collapsing-force, i.e than the force needed to cause the headrest tube to start to collapse and balloon outwards.

In fact, what sometimes happens is that a peak of press-force is needed just as the deformation of the headrest tube commences, to get the ballooning-out started; then, the press-force drops somewhat as the walls continue to buckle and collapse. Then, as mentioned, when the ring-beads are almost fully formed, and the inside surfaces of the headrest tube walls inside the ring-beads start to come together, now the much larger coining-force can be exerted on the ring-beads, squeezing them and the web together.

The coining force preferably should be several times greater than the collapsing force; a force of ten tonnes being typical in the case of a 20 mm headrest tube.

In the case of an upper ring-bead, for example, the coining force is applied by driving the nose of the upper punch against the up-facing outer surface of the upper wall of the ring-bead, which drives the down-facing surface of the upper wall hard against the up-facing surface of the lower wall, and drives the down-facing surface of the lower-wall hard against the annular margin of the through-hole in the upper surface of the web.

When the punches are withdrawn, the coined joint has very little springback, and is left tight and firm, and substantially immovable, even under accident conditions that can cause many other components to fail.

The invention claimed is:

1. A seatframe for an automobile seat, wherein:
   a top-rail of the seatframe comprises a length of hollow metal tubing;
   a headrest-support-tube of the seatframe, comprising a length of hollow metal tubing, passes through a through-hole in the top-rail;
   the top-rail has a tubular wall, including opposed upper and lower portions thereof;
   the opposed upper and lower portions of the top-rail wall have been pressed together, in such manner as to cause the top-rail to collapse locally, thereby creating a pressed-together zone of the top-rail, in which the upper and lower portions are pressed together;
   the through-hole is a hole that has been made right through both the upper and lower portions of the top-rail wall;
   the pressed-together zone of the top-rail surrounds the through-hole, and forms a margin around the through-hole, the through-hole being defined by inwards-facing hole-walls of the pressed-together zone;
   the headrest-support-tube has an upper shoulder and a lower shoulder, and the pressed-together zone of the top-rail lies between the upper and lower shoulders; and
   the opposed upper and lower portions of the top-rail wall have been pressed together into direct touching contact.

2. Seatframe of claim 1, wherein the through-hole has been punched through the pressed-together upper and lower portions of the top-rail wall.

3. Seatframe of claim 1, wherein the upper and lower shoulders of the headrest-support-tube comprise upper and lower ring-beads, formed of the metal of the headrest-support-tube that has been expanded outwards.

4. Seatframe of claim 3, wherein:
   the upper and lower ring-beads, together with the pressed-together zone around the through-hole, form a stack of metal thicknesses; and
   the stack has been squeezed flat in a press.

5. Seatframe of claim 4, wherein:
   the said stack has been squeezed flat with a heavy force, sufficient to coin the stack;
   whereby, upon the force being released, the metal thicknesses comprising the stack remain in forcefully-touching direct contact.

6. Seatframe of claim 1, wherein the seatframe includes also a second headrest-support-tube lying in a second through-hole in the top-rail.

7. Seatframe of claim 6, in combination with a headrest having first and second pegs, wherein the pegs lie assembled into the headrest-support-tube and the second headrest-support-tube respectively.

8. Seatframe of claim 1, wherein, when viewed in a lateral cross-section of the top-rail, the pressed-together zone of the top-rail does not extend all the way across the top-rail, in that a side-portion of the tubular wall comprising the top-rail was not pressed together, but has been left substantially upstanding.

9. Seatframe of claim 8, wherein, when viewed in a lateral cross-section of the top-rail:
   upstanding left and right side-portions of the top-rail wall, in relation to the pressed-together zone of the top-rail wall, have not been pressed together, but form upstanding left and right side-flanges, connected by a web;
   whereby the top-rail, at the through-hole, has a cross-sectional configuration in the form of an I-beam;
   in that the left and right side-flanges extend both upwards and downwards; and
   in that the web is flat, and symmetrical with respect to the side-flanges.

10. Seatframe of claim 9, wherein, when viewed in a lateral cross-section of the top-rail, the left and right side-flanges of the top-rail are substantial enough, and tall enough, to produce a configuration that is significantly stronger and more rigid than a completely flattened tube.

11. Seatframe of claim 10, wherein, when viewed in a lateral cross-section of the top-rail, wherein the height of the left and right side-flanges is several times the thickness of the top-rail wall.

12. Procedure for manufacturing a seatframe for an automotive seat, wherein:
   the seatframe includes a top-rail comprising a length of hollow metal tubing, having a tubular wall, including opposed upper and lower portions thereof;
   the procedure includes pressing the opposed upper and lower portions of the top-rail wall together, in such manner as to cause the top-rail to collapse locally, thereby creating a pressed-together zone of the top-rail, in which the upper and lower portions are pressed together, into direct touching contact;
   making a through-hole right through both the upper and lower portions of the top-rail wall, whereby the pressed-together zone of the top-rail surrounds the through-hole, and forms a margin around the through-hole, the through-hole being defined by inwards-facing hole-walls of the pressed-together zone;
   passing a headrest-support-tube of the seatframe, comprising a length of hollow metal tubing, through the through-hole in the top-rail;
   providing upper and lower shoulders on the headrest-support-tube and arranging the pressed-together zone of the top-rail to lie between the upper and lower shoulders.

13. Procedure of claim 12, including pre-forming one of the shoulders on the headrest-support-tube prior to passing the headrest-support-tube into the through-hole, and forming the other one of the shoulders on the headrest-support-tube after passing the headrest-support-tube into the through-hole.

14. Procedure of claim 12, including pressing the upper and lower shoulders, with the pressed-together zone of the top-rail, together as a stack in a press, with such heavy force as to coin the stack.

15. Procedure of claim 12, including pressing the opposed upper and lower portion of the top rail wall together before making the through-hole right through both the upper and lower portions of the top-rail wall.

16. Procedure of claim 15, including then passing the headrest-support-tube through the through-hole.

17. A seatframe for an automobile seat, which includes a top-rail comprising a length of hollow metal tubing, having a tubular wall, including opposed upper and lower portions thereof, that has been manufactured in accordance with the following procedure:
   pressing the opposed upper and lower portions of the top-rail wall together, in such manner as to cause the top-rail to collapse locally, thereby creating a pressed-together zone of the top-rail, in which the upper and lower portions are pressed together, into direct touching contact;
   making a through-hole right through both the upper and lower portions of the top-rail wall, whereby the pressed-together zone of the top-rail surrounds the through-hole, and forms a margin around the through-hole, the through-hole being defined by inwards-facing hole-walls of the pressed-together zone;
   passing a headrest-support-tube of the seatframe, comprising a length of hollow metal tubing, through the through-hole in the top-rail;
   providing upper and lower shoulders on the headrest-support-tube and arranging the pressed-together zone of the top-rail to lie between the upper and lower shoulders.

* * * * *